No. 693,173. Patented Feb. 11, 1902.
J. P. SNEDDON.
APPARATUS FOR SHAPING HOLLOW OR TUBULAR ARTICLES OF IRREGULAR SHAPE.
(Application filed Apr. 12, 1901.)
(No Model.)
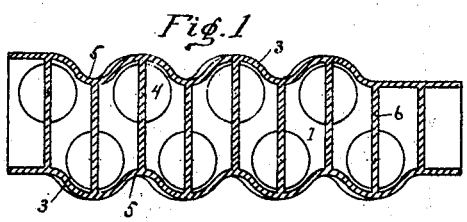
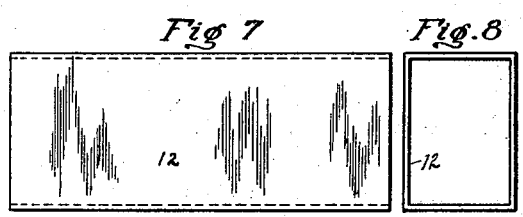
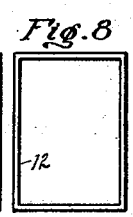
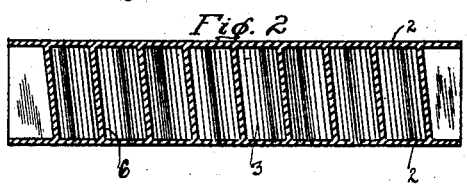
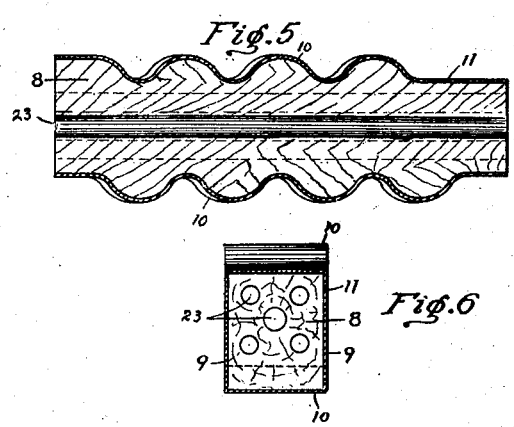
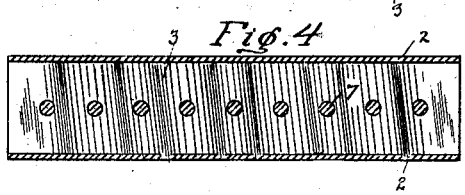
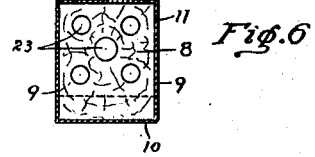
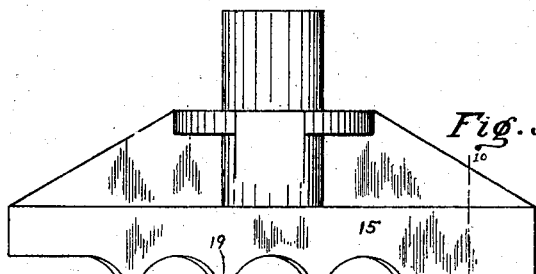
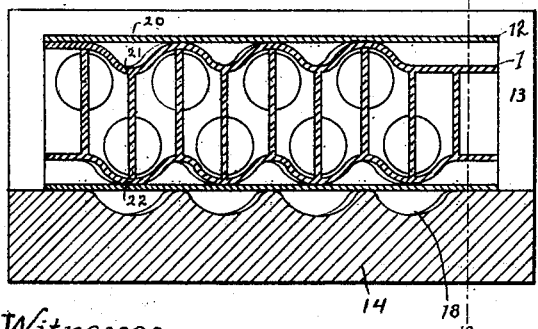
Witnesses.
Fred D. Sweet.
Inventor.
James P. Sneddon
By Kay & Totten
Attorneys.
THE NORRIS PETERS CO., PHOTO-LITHO., WASHINGTON, D. C.

UNITED STATES PATENT OFFICE.

JAMES P. SNEDDON, OF BARBERTON, OHIO, ASSIGNOR, BY MESNE ASSIGNMENTS, TO THE STIRLING COMPANY, OF JERSEY CITY, NEW JERSEY, A CORPORATION OF NEW JERSEY.

APPARATUS FOR SHAPING HOLLOW OR TUBULAR ARTICLES OF IRREGULAR SHAPE.

SPECIFICATION forming part of Letters Patent No. 693,173, dated February 11, 1902.

Application filed April 12, 1901. Serial No. 55,541. (No model.)

*To all whom it may concern:*

Be it known that I, JAMES P. SNEDDON, a resident of Barberton, in the county of Summit and State of Ohio, have invented a new and useful Improvement in Apparatus for Shaping Hollow or Tubular Articles of Irregular Shape; and I do hereby declare the following to be a full, clear, and exact description thereof.

My invention relates to apparatus for shaping hollow or tubular metal articles, such as serpentine boiler-headers, bottom blow-off connections for boilers, and other articles having an irregular shape.

Serpentine boiler-headers and similar articles are made from comparatively heavy metal, and as such articles are irregular in shape considerable difficulty has been experienced in forming such articles of wrought-iron or steel. By reason of the thickness of the metal composing such articles it requires heavy pressure to properly shape the same, and in order to prevent the collapsing of the tube during the shaping process it is necessary to use an internal support or mandrel for the same. By reason of the great irregularity in the shape of these articles difficulty has been experienced in providing a suitable internal support or mandrel which will offer sufficient resistance to the action of the external forging or pressing dies and which nevertheless is capable of being withdrawn or removed from the header or other article after the same is shaped. Heretofore serpentine headers and similar articles have been made of wrought metal only by the use of complicated sectional mandrels which were inserted in the tube and thereafter withdrawn.

It is the object of my invention to provide a mandrel for this purpose which is simple, strong, easy to use, and comparatively inexpensive. To this end it comprises a rigid destructible support which is of the proper shape to form the desired article and which is introduced into the tube and is adapted to have the walls of the latter pressed down upon the same to shape the article and which is thereafter destroyed to remove it from the finished article.

In the accompanying drawings, Figure 1 is a longitudinal vertical section of one form of my improved mandrel. Fig. 2 is a longitudinal horizontal section of the same. Fig. 3 is a longitudinal vertical section of another form of mandrel. Fig. 4 is a longitudinal horizontal section of the same. Fig. 5 is a longitudinal vertical section of still another form of mandrel. Fig. 6 is a transverse section of the same. Fig. 7 is a side view, and Fig. 8 an end view, of a suitably-formed tube for making a boiler-header. Fig. 9 is a vertical longitudinal sectional view of the dies, mandrel, and tube which is to be formed into a header; and Fig. 10 is a transverse sectional view of the same.

The mandrel shown in Figs. 1 to 4 comprises a hollow cast-iron box-like structure 1, having substantially straight parallel side walls 2 and corrugated or sinuous top and bottom walls 3. The side walls are formed with the openings 4 in order to lighten the same, and the corrugations 5 on the top and bottom walls 3 are shown as extending at an angle or obliquely across the faces of the mandrel. The object of this is to adapt the header for use in water-tube boilers in which the tubes are inclined. It will of course be understood that when the header is used on a boiler having horizontal tubes the corrugations 5 will extend straight across the top and bottom walls 3.

In the form of mandrel shown in Figs. 1 and 2 the hollow body is strengthened by means of transverse webs 6, said webs extending straight across the mandrel between the sinuous top and bottom walls in order to directly support the thrust of the dies, but being on a slight incline between the side walls, as shown in Fig. 2, corresponding to the oblique position of the corrugations 5. In case these corrugations extend straight across the webs 6 of course will also extend straight across between the side walls.

In Figs. 3 and 4 is shown a modified form of mandrel, the same comprising a similar hollow cast-iron structure provided with flat side walls, corrugated top and bottom walls, and openings in the side walls, precisely as in Figs. 1 and 2. In place of the transverse webs 6, however, the mandrel is strengthened by means of a row of transverse struts 7, which extend between the sinuous top and bottom walls, as shown, and which are substantially in a vertical line, so as to receive the direct thrust of the dies. More than a single row of these struts may be used, if necessary.

In Figs. 5 and 6 is shown still a different form of mandrel, the same comprising a wooden body 8 of the desired form, having flat side faces 9 9 and corrugated or sinuous top and bottom faces 10 10. This wooden body or core is enveloped in a sheathing of sheet metal 11, the object of the sheet metal being to protect the wooden body from burning during the formation of the header thereupon, while the wooden body 8 acts as an internal support for this hollow metal sheathing.

Either of the forms of mandrels so far described is placed within a suitable tube 12, the same being rectangular in cross-section, as shown in Figs. 7 and 8, and the tube, with the mandrel, is then placed in the dies 13, said dies comprising a sinuous or corrugated bottom die 14, which is preferably stationary, and a similarly-shaped top die 15, which is made movable and which is actuated, preferably, by a hydraulic cylinder (not shown) or by any other suitable mechanism. Formed integral with or suitably secured to the bed-die 14 is the stationary flat-faced side die 16, and on the opposite side of the bed-die is the movable flat-faced side die 17, this side die being movable, preferably, by means of a hydraulic cylinder, (not shown,) although wedges or other suitable mechanism for the purpose may be used.

The tube 12 is heated to a proper forging heat. The mandrel is then placed in the same, and said tube and mandrel are then laid upon the bed-die 14, and the side die 17 is then moved up to confine the said mandrel and tube between said die and the side die 16, after which the top die 15 is brought down, thereby pressing the tube 12 down into the corrugations 18 in the bottom die and forcing the mandrel down with the same, and at the same time the projections 19 on the upper die press the upper walls of the tube down into the corrugations in the mandrel, the action of the dies being to press the walls of the tube down into and making them conform to the corrugations on the mandrel. In this process the side walls of the tube must be upset, or, in other words, the metal between the points 20 and 21 must be forced down or up, as the case may be, into the walls of the tube between the point 21 and the point 22. In other words, the side walls of the tube must be upset an amount equal to the distance between the points 20 and 21. In order to accomplish this, it is preferable to at first bring the side die 17 only lightly against the inclosed tube and mandrel, and after the die 15 has been brought down to then bring the side die 17 firmly against said tube, and it may even be found to be best to work the dies 15 and 17 alternately toward and from the mandrel, thereby getting a gradual upsetting and forging of the metal in the side walls of the tube. It will thus be seen that it is preferable to move the side die 17 by means of a hydraulic cylinder or other means which will permit the same to be readily moved forward and back. When the forging process is completed, the die 15 is raised and the die 17 withdrawn, and the finished article on the mandrel is then taken out of said dies and another one put in its place and the forging repeated. In case this forging is done on a cast-iron mandrel, such as shown on Figs. 1 to 4, a bar or similar device is then thrust into the same to break out the webs 6 or struts 7 and collapse the walls of the mandrel 1, the pieces being removed and returned to the melting-pot and used in the casting of other mandrels. In case a mandrel such as shown in Figs. 5 and 6 is employed, the sheet-metal sheathing will prevent the burning of the wooden body during the shaping of the header; but after the latter is completed the wooden body is burned out, after which the sheet-metal sheathing 11 can be readily withdrawn. To facilitate the burning out of the wooden body 8, it is desirable to form the same with a series of longitudinal holes 23, which are formed therein by boring and which permit the flame to pass through the same and more quickly burn out the wooden core.

Various other forms of mandrels may be used for this purpose, and I wish it understood that my invention is not limited to the forms herein shown and described nor to a mandrel made in a single piece or section. It is obvious that the mandrel may be made in several pieces or sections either longitudinally or transversely. In the case of transverse sections it will be necessary to bind them together, as by a suitable tie-rod, in order that they may not move during the shaping process; but in the case of longitudinal sections this will not be necessary, as the sections when inserted in the tube cannot become displaced under the action of forging-dies. My invention is not limited in any of these particulars; but it comprises the use of any rigid destructible support having the shape of the desired article and adapted to be placed within the tube and have the walls of the latter pressed down upon the same by means of suitably-shaped dies or other means, which mandrel is then destroyed in order to remove the same from the shaped article.

All forms of the mandrel shown present a perfectly rigid support to the thrust of the forging or shaping dies, and consequently insure the header or other article being properly formed on the same, there being no possibility that the article may collapse at the one or more points. At the same time this rigid support can be readily removed from the shaped article, and when made of cast metal the broken pieces can be used in the formation of other mandrels, so that the cost of the same is practically merely the cost of making and pouring the molds for the same.

In the drawings I have shown my invention applied in the formation of serpentine boiler-headers, and I have described the same as applied thereto; but it will of course be understood that the invention may be applied in the formation of tubular metal articles of other kinds or shapes or to headers of other shapes than serpentine by suitably changing the shape of the mandrel and compressing-dies, as will be readily understood.

What I claim as my invention, and desire to secure by Letters Patent, is—

1. A mandrel for use in shaping wrought-metal headers or other tubular articles of irregular outline longitudinally, the same comprising a rigid destructible support corresponding in shape to the article to be formed, and adapted to be inserted in the tube and have the latter pressed thereupon.

2. A mandrel for use in shaping wrought-metal headers or other tubular articles of irregular outline longitudinally, the same comprising a rigid destructible support provided with transverse corrugations, and adapted to be inserted in the tube and have the latter pressed thereupon.

3. A mandrel for use in shaping wrought-metal headers or other tubular articles of irregular outline longitudinally, the same comprising a rigid destructible support provided with oblique transverse corrugations on its upper and lower faces, and adapted to be inserted in the tube and have the latter pressed thereupon.

4. A mandrel for use in shaping wrought-metal headers or other tubular articles of irregular outline longitudinally, the same comprising a rigid hollow body corresponding in shape to the article to be formed and provided with rigid internal supports to strengthen the same.

5. A mandrel for use in shaping wrought-metal headers or other tubular articles of irregular outline longitudinally, the same comprising a rigid hollow body corresponding in shape to the article to be formed and provided with internal transverse webs.

6. A mandrel for use in shaping wrought-metal headers or other tubular articles of irregular outline longitudinally, the same comprising a rigid hollow cast-metal body corresponding in shape to the article to be formed and provided with internal transverse supports.

7. A mandrel for use in shaping wrought-metal headers or other tubular articles, the same comprising a hollow cast-metal body having upper and lower corrugated faces, and internal transverse supports extending between said corrugated faces.

8. In apparatus for shaping wrought-metal headers or other tubular metal articles of irregular outline longitudinally, the combination of suitable forging means, and a mandrel comprising a rigid support corresponding in shape to the article to be formed and adapted to be inserted in the tube and have the latter pressed down thereupon by the forging means.

9. In apparatus for shaping wrought-metal headers or other tubular metal articles, the combination of top and bottom dies provided with transverse corrugations, and a mandrel comprising a rigid support having transverse corrugations corresponding to the corrugations of the top and bottom dies, and adapted to be inserted in the tube and have the latter pressed thereupon by the dies.

10. In apparatus for shaping wrought-metal headers or other tubular articles, the combination with suitable top, bottom and side dies, the top die and one side die being movable, and a mandrel comprising a rigid support adapted to be inserted in the tube and have the latter pressed thereupon by the dies.

11. In apparatus for shaping wrought-metal headers or other tubular articles, the combination with corrugated top and bottom dies and plain-faced side dies, the top die and one of the side dies being movable, of a mandrel comprising a rigid support having its top and bottom faces corrugated to correspond to the top and bottom dies, and its side faces plain, and adapted to be inserted in the tube and have the latter pressed down thereupon by the dies.

In testimony whereof I, the said JAMES P. SNEDDON, have hereunto set my hand.

JAS. P. SNEDDON.

Witnesses:
O. D. EVERHARD,
E. E. BAKER.